March 29, 1966 RAYMOND T. MATSUMOTO ETAL 3,243,607
LOW-LEVEL TRANSISTOR SWITCH
Filed Jan. 2, 1964
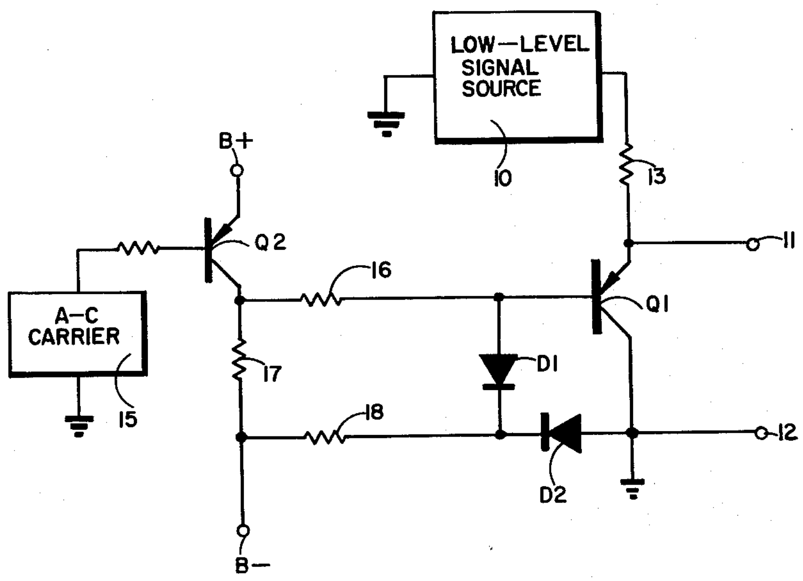
INVENTORS
RAYMOND T. MATSUMOTO
JOHN P. SWANSON
BY A. M. Fernandez
ATTORNEY United States Patent Office 3,243,607

Patented Mar. 29, 1966

3,243,607

LOW-LEVEL TRANSISTOR SWITCH

Raymond T. Matsumoto, Cypress, and John P. Swanson, Orange, Calif., assignors to North American Aviation, Inc.

Filed Jan. 2, 1964, Ser. No. 335,339
2 Claims. (Cl. 307—88.5)

This invention relates to a low-level transistor switch, and more particularly to a transistor switch suitable for use in place of electro-mechanical choppers or synchronous vibrators for modulating and demodulating low-level signals.

In analog systems, the modulation of low-level input signals of full scale ranges from 10 to 100 millivolts requires zero offset errors of the modulator to be less than a few microvolts if an accuracy of 0.1% is to be maintained. Zero offset is defined as the magnitude of the output signal provided by the modulator, referred to the input as a reference, when the analog input is zero. Where the modulator is employed in a modulated-carrier-type operational amplifier, the most critical portion of the entire amplifier is the chopper or modulating switch.

When a transistor is employed as a modulating switch, it is common practice to operate the transistor in the inverted connection to minimize the internally generated zero offset voltages, particularly that due to the finite internal impedance of the transistor while it is conducting at saturation, i.e. when the switch is closed. The zero offset due to leakage current in the transistor while it is cut off, i.e. when the switch is open, poses a more serious problem. It has been recognized in the past that if the base of the switching transistor is not driven positive with respect to the other electrodes in the case of a PNP transistor, but instead is connected to ground through a low impedance when the transistor is cut off, the potential differences which cause the major portion of leakage current to flow is removed, and the zero offset due to leakage current is reduced.

The zero offset during cutoff is a more serious problem because a transistor is never completely cut off but always has a residual current $I_c0$. To reduce the leakage $I_c0$, reverse base current is usually provided in the manner taught by the Gerhard Patent 3,003,122, which is to forward bias a clamping diode between the base of the transistor and ground through a back-biased coupling the base to the modulating or carrier signal source. The difficulty with that arrangement is that although the base is clamped to ground while the transistor is cut off, preferably through a low impedance germanium diode, insufficient current is provided in the base to eliminate all of the leakage current $I_c0$.

An object of this invention is to provide an improved low-level transistor switch.

Another object is to provide an improved arrangement for reducing leakage current $I_c0$.

These and other objects, and features of novelty, that characterize the invention are pointed out with particularity in the appended claims which form a part of this specification. For a better understanding of the invention, an illustrative embodiment is described with reference to the accompanying drawing in which the sole figure shows an inverted PNP transistor $Q_1$ operated as a switch for modulating a low-level analog signal from a source 10.

While the switching transistor $Q_1$ is cut off, the analog signal appears at output terminals 11 and 12 coupled to the source 10 by a resistor 13 of reasonably high impedance. When the transistor $Q_1$ is switched to conduction at saturation, the output terminal 11 is clamped to ground. If the transistor $Q_1$ is switched at a fixed frequency by an A.C. carrier signal from a source 15, the result is an amplitude modulated carrier signal across the output terminals 11 and 12. That signal may then be suitably amplified by an A.C. amplifier and demodulated by another synchronized switch to detect its amplitude. Thus the amplification of a high-gain, D.C. amplifier may be achieved by a stable A.C. amplifier.

Since the transistor $Q_1$ is conducting at saturation, the signal at the output terminal 11 is not at ground, but at some very low amplitude. Such an error may be compensated if desired in the manner indicated in the aforesaid Gerhard patent, as by connecting an equal and opposite voltage source in series between the transistor and ground. However, for most applications that low voltage error is insignificant and may be ignored. The more significant error is the voltage drop produced across the resistor 13 due to leakage current while the transistor $Q_1$ is cut off.

A second transistor $Q_2$ is provided to switch the transistor $Q_1$ off through a coupling resistor 16 in response to the A.C. carrier from the source 15. While the transistor $Q_2$ is cut off during a positive half cycle of the carrier signal, the transistor $Q_1$ is driven to saturation by a negative drive current supplied by a potential source B— through the resistor 16 and a resistor 17. When the transistor $Q_2$ is turned on during a negative half cycle of the carrier signal, the junction between the resistors 16 and 17 is clamped to a positive potential B+, thereby cutting off the transistor $Q_1$.

The leakage current $I_c0$ is virtually eliminated by providing sufficient positive current into the base of the transistor $Q_1$ to not only cut it off but to also effectively counteract the leakage current. Oppositely poled diodes $D_1$ and $D_2$ are serially connected between the base of the transistor $Q_1$ and ground, and forward biased by a resistor 18 connected to the potential source B—, in order to provide a low impedance path to ground for excess positive base current.

While the transistor $Q_2$ is on, the potential at its collector is B+, a voltage sufficiently positive to turn the transistor $Q_1$ off. Any leakage current in the transistor $Q_1$ will tend to drive its base to a negative potential, thereby tending to forward bias the transistor and increase the leakage current. To counteract that, the diodes $D_1$ and $D_2$ are selected to provide a potential of opposite polarity, thereby placing the base of the transistor $Q_1$ at virtually ground potential. Thus positive base current is provided through the transistor $Q_2$ and the resistor 16 into the base of the transistor $Q_1$ to just cut off the transistor $Q_1$ and counteract the leakage current $I_c0$.

The signal input from the source 10 is normally of either polarity and about 200 millivolts or less, but may be larger. If it is a positive signal, the largest acceptable signal for proper operation is +300 millivolts; otherwise, when a bias of —300 millivolts is provided by the diodes $D_1$ and $D_2$, the transistor $Q_1$ may become forward biased, not as an inverted transistor switch but as an emitter follower.

In operation, assuming a negative signal from the source 10, the transistor $Q_1$ functions as an inverted transistor switch so that its electrode connected to ground is to be considered the emitter. Under those circumstances, while the transistor $Q_2$ is turned off, a negative current through the resistors 16 and 17 drives the transistor $Q_1$ to saturation. The output terminal 11 is then shorted to ground and the base of the transistor is at —600 millivolts due to the voltage drop between the base and the collector electrode functioning as an emitter.

When the transistor $Q_2$ is turned on, the transistor $Q_1$ is turned off. The junction between the two diodes is maintained at a negative potential by the current through it and the bias resistor 18. Accordingly, the positive current through the resistor 16 which is in excess of that necessary to turn the transistor $Q_1$ off is diverted through the diode $D_1$. Thus positive base current provided in accordance with the present invention is always sufficient to virtually eliminate the leakage current $I_c0$.

If the diodes $D_1$ and $D_2$ are identical, the base of the transistor $Q_1$ is at virtual ground while it is turned off, and the total change of the base potential is approximately 600 millivolts, the base-to-emitter potential of a conducting silicon transistor. Since noise induced in the output terminal 11 due to the interelectrode capacitance, and not leakage current $I_c0$, is proportional to the total change of the base potential, the induced noise may be readily reduced without affecting the reduction of the leakage current $I_c0$ by providing a larger voltage drop across the diode $D_2$ than across the diode $D_1$. That may be readily accomplished by selecting a germanium diode for the latter and a silicon diode for the former, thereby providing a net bias of —300 millivolts at the base of the transistor $Q_1$ when it is turned off, instead of a net bias of zero volts. The total change of the base potential is then reduced to approximately 300 millivolts, and the induced noise into output terminal 11 is proportionately reduced.

The operation is substantially the same for positive signals from the signal source 10 except that the maximum signal amplitude acceptable for proper operation is approximately 300 millivolts if germanium and silicon are selected for the diodes $D_1$ and $D_2$ respectively. The reason is that with a net bias of —300 millivolts at the base of the transistor $Q_1$ a positive potential greater than 300 millivolts at the signal source 10 can cause it to function as an emitter-follower. However, in most applications, a signal range of 10 to 100 millivolts is sufficient and proper operation of the present invention is assured over a range of 1 to 200 millivolts.

While the principles of the invention have now been made clear in an illustrative embodiment, there will be immediately obvious to those skilled in the art many modifications in structure, proportions and elements used in the practice of the invention, and otherwise, which are particularly adapted for specific environments and operating requirements, without departing from those principles. The appended claims are therefore intended to cover and embrace any such modifications within the limits only of the true spirit and scope of the invention.

We claim:

1. A switching circuit comprising an electronic valve having electron collecting, emitting and control electrodes, said collector electrode being connected to a point of reference potential, a low-level signal source connected between said collector and emitter, a source of bias potential, impedance means, a first diode, said first diode, said impedance, and said source forming a series voltage divider circuit, said control electrode being connected to a common connection of said impedance means and first diode so as to apply the potential of said reference potential on said control electrode when said first diode is conducting and forward biased by said source, a second series circuit including said point of reference potential, said source of bias potential and a second diode with said second diode connected between said point and said first diode, a bipolar signal source applied to said control electrode of said electronic valve, and said first diode being polarized for forward conduction in response to one polarity of said signal.

2. A low-level switch comprising a transistor having a collector, emitter and base electrode, a low-level signal source connected between said collector and emitter, means for providing positive and negative control voltages, first impedance means coupling said control voltage means to said base, a first semiconductor diode having one terminal connected to said collector, means for forward biasing said first diode, and a second semiconductor diode connected between said base and said first diode, said second diode being polarized for forward conduction of the same polarity as said first diode with reference to conduction through said biasing means, and the diode junctions of said transistor and said first diode have similar impedance characteristics and said second diode has a lower impedance characteristic than said first diode.

References Cited by the Examiner

UNITED STATES PATENTS 3,003,122 10/1961 Gerhard ______________ 332—9

FOREIGN PATENTS 881,150 11/1961 Great Britain.

ARTHUR GAUSS, *Primary Examiner.*

I. C. EDELL, *Assistant Examiner.*